June 9, 1964   C. B. BAKER   3,136,020
FASTENING DEVICE
Filed Dec. 14, 1960
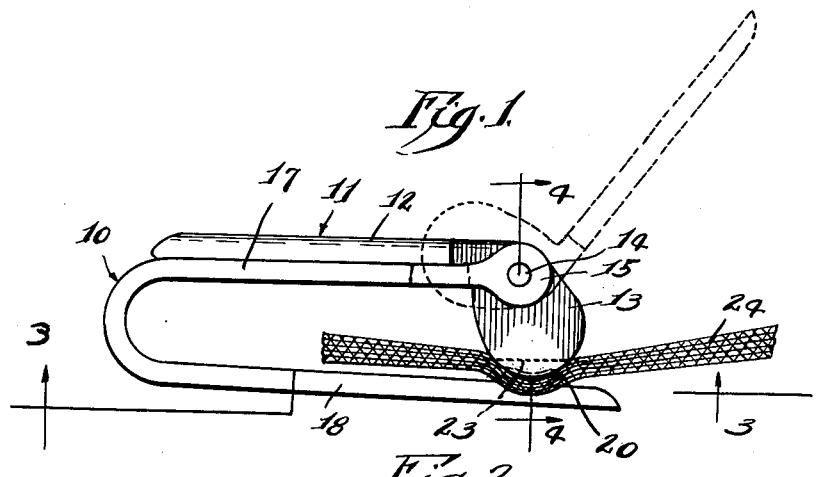
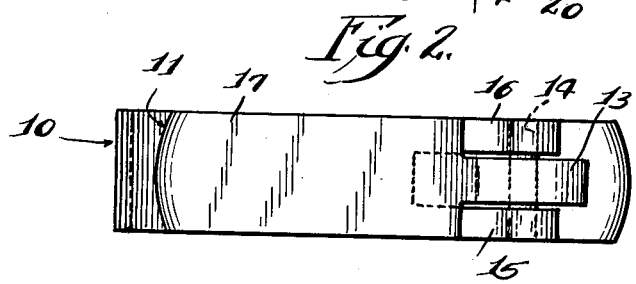
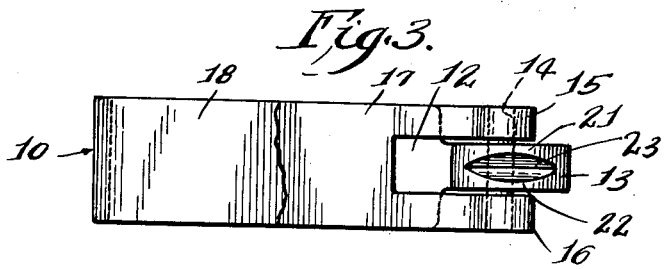
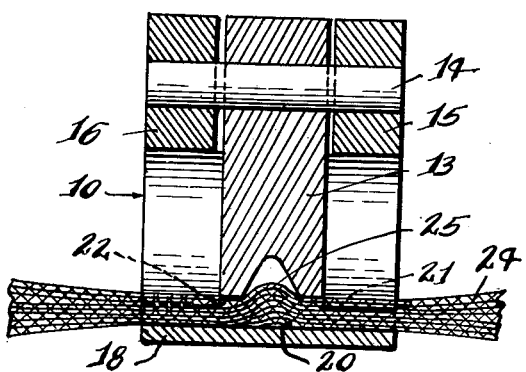
Inventor.
Charles B. Baker.
Hofgren, Brady, Wegner,
Allen and Stellman
Attorneys United States Patent Office 3,136,020
Patented June 9, 1964

3,136,020
FASTENING DEVICE
Charles B. Baker, 5642 Hillcrest, Downers Grove, Ill.
Filed Dec. 14, 1960, Ser. No. 75,828
3 Claims. (Cl. 24—248)

This invention relates to a fastening device, and more particularly to a fastening device adapted for use in securing a diaper upon a baby. This application is a continuation-in-part of my copending application, Serial No. 589,125 filed June 4, 1956, now Patent No. 2,971,236.

Common safety pins have many well known disadvantages when used in securing diapers upon babies. Frequently either the baby or the person putting the diaper on the baby is pricked by the sharp end of the safety pin in attempting to pass the pin through the thickness of the diaper. It is not uncommon for a safety pin to become unclasped while in use resulting in the piercing of the baby's skin by the needlelike point of the safety pin. Other hazards constantly confronting a parent using safety pins around his child are the danger that the child may swallow an unclasped pin, or that an open pin might fall from the hand upon the face of the child.

The present invention obviates all of the above undesirable features present in the common safety pin, and in addition, provides a fastening device which is more durable, which is more easily fastened in place and which has superior fastening qualities in operation. Accordingly, the primary object of the present invention is to provide a new and improved fastening device which is particularly well adapted for holding cloth materials together.

Another object is to provide a fastening device adapted to grip cloth material at spaced points to prevent twisting of the cloth with respect to the device.

Another object is to provide a fastening device adapted for gripping cloth materials of various thicknesses.

Still another object is to provide a fastening device in which one of the gripping elements is swingably mounted and passes over center in moving to fastening position to assure that the device remains in fastening position.

Yet another object is to provide a fastening device having a rounded gripping cam surface formed to cooperate with a mating depressed gripping surface on a frame so as to gradually and progressively frictionally grip cloth material interposed between the two surfaces.

The invention is illustrated in a preferred embodiment in the accompanying drawings, in which:

FIG. 1 is a side elevational view of the fastening device in fastening or gripping position, the swingable member in dotted outline illustrating the fastening device in open position;

FIG. 2, a top plan view of FIG. 1 but not showing the cloth material which is gripped by the fastening device;

FIG. 3, a sectional view taken as indicated on line 3—3 of FIG. 1, but not showing the gripped cloth material; and FIG. 4, an enlarged sectional view taken on line 4—4 of FIG. 1.

In the embodiment illustrated in FIG. 1, the fastening device comprises a U-shaped member or frame, preferably of resilient material, generally designated 10, and a swingable member, generally designated 11. The swingable member 11 may include a finger lever 12 and a cam head or member 13 which is preferably eccentrically mounted upon a pin 14 journaled in the bifurcated portions 15 and 16 at the free end of an arm 17 of the U-shaped member 10. The above described elements may be made from an appropriate metal, from plastic or from a combination of the two.

The U-shaped member 10 has a second arm 18 which is generally parallel to, and spaced from, the arm 17. As best seen in FIG. 1, it is preferred that the arm 18 has a depressed surface 20 near its free end to cooperate with a pair of generally rounded, convex gripping surfaces 21 and 22 separated by a notched or relieved portion 23 on the cam head 13 (FIG. 3). As can be seen in FIG. 1, the depressed surface 20 is located outwardly toward the open end of the U-shaped member 10 farther than the center of pivot of the cam head 13, and the cam head 13 is shaped so that when moved to fastening position, as shown in FIG. 1, the cam head 13 passes over center and the gripping surfaces 21 and 22 are in opposed relation to the mating depressed surface 20. While the diaper is held very securely when the fastening device is in fastening position, the movement of the cam head 13 is easy and effortless because of the gradual and progressive increase of pressure by the cam head during its swinging movement.

In operation, the swingable member 12 is initially swung to open position as indicated in dotted outline in FIG. 1. The U-shaped member is then advanced so that a marginal edge portion of the diaper or other cloth material 24 enters the open end of the U-shaped member 10. The swingable member may next be pivoted, counterclockwise as shown in FIG. 1, to fastening position in which the finger member lies adjacent the arm 17 of the U-shaped member 10 and the diaper or cloth material is gripped between the depressed surface 20 of the arm 18 and the cooperating gripping surfaces 21 and 22 of the cam head. It will be noted that any force tending to pull the diaper or cloth material out of the open end of the U-shaped member merely presses the finger lever more tightly against the arm 17 and the fastening device will not become unclasped.

Furthermore, it will be noted that as the cam member 13 is swung toward fastening position, the convex gripping surfaces 21 and 22 cooperate with the laterally extending depressed surface 20 to gradually and progressively frictionally grip the interposed cloth material 24 with increasing pressure until fastening position is reached, at which time the convex gripping surfaces are juxtaposed with their mating depressed surface 20. The rounded shape of the cam member 13 and the location of the depressed surface 20 are such that the cam must pass over-center of its pivot 14 in order to be fully moved into fastening position. This alone effectively latches the cam member in fastening position and prevents its disengagement from the cloth material 24.

However, in addition, the resiliency of the arm 18 of the frame 10 (shown sprung downwardly in FIG. 1) assures that a yielding pressure is continually exerted upon the cloth 24 interposed between the cam 13 and the depressed surface 20 of the arm 18. As best shown in FIG. 4, the spaced gripping surfaces 21 and 22 permit an intermediate portion 25 of the cloth 24 to be displaced upwardly into the notched portion 23 so as to further facilitate the gradual and progressive frictional gripping action on the cloth by the fastening device in moving toward fastening position. The relieved portion 23 also assists the fastening device in accommodating itself to cloth material of increased thickness.

The foregoing detailed description is given for clearness of understanding only and no unnecessary limitations should be understood therefrom, for some modifications will be obvious to those skilled in the art.

I claim:

1. A fastening device for gripping cloth material, comprising: a U-shaped frame having a pair of opposed arms of resilient material, one of the arms having a transverse depression therein to afford a concave gripping surface; a cam member journaled on the free end of the other of the arms for swinging movement between a fastening position and an open cloth-receiving position in which the cam member is spaced from the one arm, said cam member having a convex arcuate gripping surface positioned in opposition to said concave gripping surface for cooperation therewith when in fastening position to frictionally grip interposed cloth material in an arcuate pattern between said gripping surfaces, said cam member being so journaled and said concave gripping surface being so positioned that the cam member passes overcenter when moved to fastening position with said surfaces gripping the cloth material; and a finger lever secured to the cam member for swinging said cam member between open and fastening position, said finger lever lying adjacent said one arm when the cam member is in over-centered fastening position.

2. A fastening device for gripping cloth material, comprising: a U-shaped frame member having a pair of opposed arms of resilient material; a cam member journaled on the free end of one of the arms for swinging movement between a fastening position and an open cloth-receiving position in which the cam member is spaced from the other arm, the cam member having a convex arcuate gripping portion which is inwardly relieved to afford a pair of laterally spaced arcuate gripping surfaces, said pair of arcuate gripping surfaces being positioned in opposition to the other of the resilient arms for cooperation therewith when in fastening position to frictionally grip interposed cloth material, the cam member when swung toward fastening position causing said pair of arcuate gripping surfaces to grip the cloth material gradually and progressively with increasing pressure, said cam member being so journaled that its convex gripping portion passes over-center when swung to fastening position so as to be retained in said fastening position by the yieldable resilience between the arms of the frame; and a finger lever secured to the cam member for swinging said cam member between open and fastening positions, said finger member lying adjacent said one arm when said cam member is in fastening position.

3. A fastening device for gripping cloth material as specified in claim 2, in which the other of the resilient arms is provided with a transverse depression therein to afford a concave gripping surface, the concave gripping surface being positioned to receive the pair of arcuate gripping surfaces when the cam member is swung to fastening position, the pair of arcuate gripping surfaces and the concave gripping surface cooperating to frictionally grip interposed cloth material in laterally spaced arcuate patterns between said gripping surfaces.

References Cited in the file of this patent

UNITED STATES PATENTS

| | | |
|---|---|---|
| 3,884 | Beverly | Jan. 16, 1845 |
| 327,282 | Levett | Sept. 29, 1885 |
| 435,887 | Ellithorp | Sept. 2, 1890 |
| 686,439 | Bradley | Nov. 12, 1901 |
| 706,522 | Bryant | Aug. 12, 1902 |
| 1,984,969 | Fisher et al. | Dec. 18, 1934 |
| 2,314,859 | Straits | Mar. 23, 1943 |
| 2,398,962 | Randrup | Apr. 23, 1946 |

FOREIGN PATENTS

| | | |
|---|---|---|
| 6,801 | Great Britain | of 1911 |
| 203,595 | Canada | Aug. 31, 1920 |
| 424,368 | France | Mar. 13, 1911 |
| 58,646 | Switzerland | Jan. 19, 1912 |